(12) United States Patent
Lu et al.

(10) Patent No.: US 10,536,752 B2
(45) Date of Patent: Jan. 14, 2020

(54) ACQUIRING AND STORING PLAY PROGRESS FOR A MULTIMEDIA FILE

(71) Applicants: Beijing Lenovo Software Ltd., Beijing (CN); Lenovo (Beijing) Limited, Beijing (CN)

(72) Inventors: Linxuan Lu, Beijing (CN); Shu Gao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 1043 days.

(21) Appl. No.: 14/478,448

(22) Filed: Sep. 5, 2014

(65) Prior Publication Data

US 2015/0169157 A1    Jun. 18, 2015

(30) Foreign Application Priority Data

Dec. 16, 2013  (CN) .......................... 2013 1 0687496

(51) Int. Cl.
*H04N 21/472* (2011.01)

(52) U.S. Cl.
CPC .............................. *H04N 21/47217* (2013.01)

(58) Field of Classification Search
CPC ............. G06F 17/30026; G06F 3/0482; G06F 3/04842; G06F 3/165; G06F 3/04847; G06F 3/0488; H04N 21/47217; H04N 21/4333
USPC ........................................................ 715/716
See application file for complete search history.

(56) References Cited

U.S. PATENT DOCUMENTS

| | | | |
|---|---|---|---|
| 2002/0099552 A1 | 7/2002 | Rubin et al. | |
| 2005/0024545 A1* | 2/2005 | Borden | G11B 15/023 348/734 |
| 2006/0029363 A1* | 2/2006 | Iggulden | G11B 15/023 386/250 |
| 2006/0287869 A1* | 12/2006 | Kaneko | G10L 15/26 704/275 |
| 2007/0003215 A1* | 1/2007 | Ito | G11B 27/005 386/344 |
| 2007/0061852 A1* | 3/2007 | Hagiwara | H04N 7/17318 725/88 |

(Continued)

FOREIGN PATENT DOCUMENTS

| | | |
|---|---|---|
| CN | 1617256 A | 5/2005 |
| CN | 101273575 A | 9/2008 |
| CN | 101833876 A | 9/2010 |

*Primary Examiner* — Asher D Kells
(74) *Attorney, Agent, or Firm* — Schwegman Lundberg & Woessner, P.A.

(57) ABSTRACT

Disclosed is an information processing method and an electronic device capable of playing a multimedia file. The method includes when detecting a first operation of adjusting a play time of a multimedia file from a first time to a second time different from the first time in the process of playing the multimedia file, acquiring and storing a play progress of the multimedia file corresponding to the first time; and when detecting a second operation of a user, retrieving the play progress of the multimedia file corresponding to the first time and playing the multimedia file from the play progress corresponding to the first time in response to the second operation. With the method and electronic device, a video can accurately return to a play progress corresponding to a previous play time after a fast forward or rewind is performed in the process of playing the video.

15 Claims, 2 Drawing Sheets

(56) References Cited

U.S. PATENT DOCUMENTS

| | | | |
|---|---|---|---|
| 2009/0019279 A1* | 1/2009 | Kato | H04L 9/085 |
| | | | 713/150 |
| 2010/0086277 A1* | 4/2010 | Craner | H04N 5/76 |
| | | | 386/278 |
| 2013/0106586 A1* | 5/2013 | Vidal | G05B 15/02 |
| | | | 340/12.22 |

* cited by examiner

ACQUIRING AND STORING PLAY PROGRESS FOR A MULTIMEDIA FILE

CROSS-REFERENCE TO RELATED APPLICATION

This application claims priority to the Chinese Patent Application No. 201310687496.X, filed on Dec. 16, 2013, entitled "Information Processing Method and Electronic Device", which is incorporated herein by reference in its entirety.

TECHNICAL FIELD

The disclosure relates to information processing, and more particularly, to information processing methods and electronic devices.

BACKGROUND

With popularization of electronic devices such as smart phone, tablet computer, notebook computer, and smart TV, videos carried by such electronic devices including online videos, remote education videos, video conferences and the like are constantly introduced to people's works and lives.

Conventionally, if a user clicks on a play progress bar unintentionally in the process of viewing a video, and thus fast forwards or rewinds the video to a play time different from the current play time, the user can only rely on his or her memory of the current play time in order to make the video jump back to the play time. This may require the user to click on the play progress bar multiple times. Therefore, it is inconvenient for the user to view the video.

In order to prevent the video from jumping to another play time due to misoperation of a user when viewing the video, many existing video play applications have a video-locking function. When a user enables the video-locking function, the user can not perform operations such as fast forward, rewind, or pause etc. on the video. If the user wants to perform such an operation on the video, he or she has to first deactivate the video-locking function.

The above conventional solutions have at least the following problems.

In the process of playing a video, the video may not accurately return to the previous play time after being changed to another play time by a misoperation of a user. On the other hand, the video-locking function, once activated, may cause inconvenience to the user. These problems lead to degraded user experience of video viewing.

SUMMARY

Embodiments of the present application provide information processing methods and electronic devices, in view of the problems with the conventional solutions that the play progress of a video can not accurately return to a previous play time after being fast forwarded or rewound to another play time.

The embodiments of the present application provide an information processing method applied in an electronic device capable of playing a multimedia file, the method comprising:

when detecting a first operation of adjusting a play time of the multimedia file from a first time to a second time different from the first time in the process of playing the multimedia file, acquiring and storing a play progress of the multimedia file corresponding to the first time; and when detecting a second operation of a user, retrieving the play progress of the multimedia file corresponding to the first time and playing the multimedia file from the retrieved play progress in response to the second operation.

In an embodiment, said acquiring and storing a play progress of the multimedia file corresponding to the first time further comprises:

acquiring the first time and the second time;

acquiring a time difference between the second time and the first time; and when the time difference is larger than a preset threshold, storing the play progress of the multimedia file corresponding to the first time.

In an embodiment, the method further comprises after storing the play progress of the multimedia file corresponding to the first time:

playing the multimedia file from a play progress corresponding to the second time.

In an embodiment, the method further comprises after playing the multimedia file from the play progress corresponding to the second time:

when the multimedia file is played to a third time after the second time, and the user performs a third operation of adjusting the play time of the multimedia file from the third time to a fourth time different from the third time, acquiring and storing a play progress of the multimedia file corresponding to the third time and a play progress of the multimedia file corresponding to the fourth time; and when detecting a fourth operation of the user, retrieving the play progress of the multimedia file corresponding to the third time and playing the multimedia file from the play progress corresponding to the third time in response to the fourth operation.

In an embodiment, the method further comprises after playing the multimedia file from the play progress of the multimedia file corresponding to the third time:

when detecting the second operation, retrieving the play progress of the multimedia file corresponding to the first time and playing the multimedia file from the play progress corresponding to the first time in response to the second operation.

In an embodiment, the method further comprises after playing the multimedia file from the play progress corresponding to the first time:

when detecting a fifth operation of the user, retrieving the play progress of the multimedia file corresponding to the third time and playing the multimedia file from the play progress corresponding to the third time in response to the fifth operation.

In an embodiment, the method further comprises after playing the multimedia file from the play progress corresponding to the third time:

when detecting a sixth operation of the user, retrieving the play progress of the multimedia file corresponding to the fourth time and playing the multimedia file from the play progress corresponding to the fourth time in response to the sixth operation.

In an embodiment, each of the second, fourth, fifth and sixth operations comprises a recovery operation.

The embodiments of the present application also provide an electronic device, comprising:

a first processing unit configured to acquire and store a play progress of a multimedia file corresponding to a first time when detecting a first operation of adjusting a play time of the multimedia file from the first time to a second time different from the first time in the process of playing the multimedia file; and a second processing unit configured to, when detecting a second operation of a user, retrieve the play progress of the multimedia file corresponding to the first time and play the multimedia file from the play progress corresponding to the first time in response to the second operation.

In an embodiment, the first processing unit further comprises:

a first acquisition subunit configured to acquire the first time and the second time when detecting the first operation of adjusting a play time of the multimedia file from the first time to the second time;

a second acquisition subunit configured to acquire a time difference between the second time and the first time; and a first storage subunit configured to store the play progress of the multimedia file corresponding to the first time when the time difference is larger than a preset threshold.

In an embodiment, the second processing unit is further configured to play the multimedia file from a play progress corresponding to the second time after storing the play progress of the multimedia file corresponding to the first time.

In an embodiment, the first processing unit is further configured to acquire and store a play progress of the multimedia file corresponding to a third time after the second time and a play progress of the multimedia file corresponding to a fourth time different from the third time, when the multimedia file is played to the third time, and the user performs a third operation of adjusting the play time of the multimedia file from the third time to the fourth time after playing the multimedia file from a play progress corresponding to the second time; and the second processing unit is further configured to, when detecting a fourth operation of the user, retrieve the play progress of the multimedia file corresponding to the third time and play the multimedia file from the play progress corresponding to the third time in response to the fourth operation.

In an embodiment, the second processing unit is further configured to, when detecting the second operation after playing the multimedia file from the play progress of the multimedia file corresponding to the third time, retrieve the play progress of the multimedia file corresponding to the first time and play the multimedia file from the play progress corresponding to the first time in response to the second operation.

In an embodiment, the second processing unit is further configured to, when detecting a fifth operation of the user after playing the multimedia file from the play progress corresponding to the first time, retrieve the play progress of the multimedia file corresponding to the third time and play the multimedia file from the play progress corresponding to the third time in response to the fifth operation.

In an embodiment, the second processing unit is further configured to, when detecting a sixth operation of the user after playing the multimedia file from the play progress corresponding to the third time, retrieve the play progress of the multimedia file corresponding to the fourth time and play the multimedia file from the play progress corresponding to the fourth time in response to the sixth operation.

The embodiments of the present application further provide a computer-readable medium storing computer instructions thereon, wherein when executed, the computer instructions cause an electronic device to perform the above information processing method.

One or more of the solutions according to the embodiments of the present application provide at least the following advantages.

1. In the embodiments of the present application, when a first operation of adjusting a play time of a multimedia file from a first time to a second time different from the first time is detected in the process of playing the multimedia file, a play progress of the multimedia file corresponding to the first time is acquired and stored; and then a second operation of a user is acquired by detection, and the play progress of the multimedia file corresponding to the first time is retrieved to play the multimedia file from the play progress corresponding to the first time in response to the second operation. Therefore, even when a user misoperates a video unintentionally to fast forward or rewind the video to another play time, the video can return to a play progress corresponding to a play time before the misoperation through a recovery operation. This solves the technical problem that a video can not accurately return to the play progress corresponding to the previous play time for playback after being fast forwarded or rewound in the process of playing the video, and improves user experience.

2. In the embodiments of the present application, play progresses corresponding to multiple time points in a video can be stored. Therefore, the video can still accurately return to a play progress corresponding to a previous play time after multiple fast forwards or rewinds in the process of viewing a video by a user. For example, play progresses corresponding to three time points are stored in the electronic device, i.e., a play progress corresponding to a first time, a play progress corresponding to a second time, and a play progress correspond to a third time, which correspond to a first fast forward, a second fast forward, and a third fast forward of the user respectively, are stored in the process of playing the video. When the user performs one recovery operation, the video will start to be played from the play progress corresponding to the third time; when the user performs two recovery operations successively, the video will start to be played from the play progress corresponding to the second time; and when the user performs three recovery operations successively, the video will start to be played from the play progress corresponding to the first time. In this way, the video is able to return to a play progress corresponding to a previous play time even after multiple fast forwards or rewinds, thereby improving user experience.

DETAILED DESCRIPTION OF THE EMBODIMENTS

Information processing methods and electronic devices according to the embodiments of the present application solve the technical problem that a video can not accurately return to a play progress corresponding to a previous play time after being fast forwarded or rewound in the process of playing the video.

In view of the above technical problem, the general concept of the technical solutions according to the embodiments of the present application is described below.

When detecting a first operation of adjusting a play time of a multimedia file from a first time to a second time different from the first time in the process of playing the multimedia file, an electronic device acquires and stores a play progress of the multimedia file corresponding to the first time; and when the electronic device detects a second operation of a user, it retrieves the play progress of the multimedia file corresponding to the first time and plays the multimedia file from the play progress corresponding to the first time in response to the second operation. Therefore, even when the user misoperates the video unintentionally to fast forward or rewind the video to another play time, the video can return to a play progress corresponding to the play time before the misoperation through a recovery operation. This solves the technical problem that a video can not accurately return to a play progress corresponding to a previous play time for playback after a fast forward or rewind in the process of playing the video.

The technical solutions of the present invention will be described in detail below in conjunction with accompanying drawings and specific embodiments. It should be understood that, the embodiments of the present application and the specific features in the embodiments are indented to specifically describe the technical solutions of the invention, instead of limiting the technical solutions of the invention. The embodiments of the present application and the technical features in the embodiments can be combined with each other without conflict.

The embodiments of the present application provide information processing methods and electronic devices. In a specific implementation, the electronic device may be a smart phone, a tablet computer or a notebook computer or any other device capable of playing a multimedia file, which is not limited by the embodiments of the present application.

First Embodiment

Figure 1:
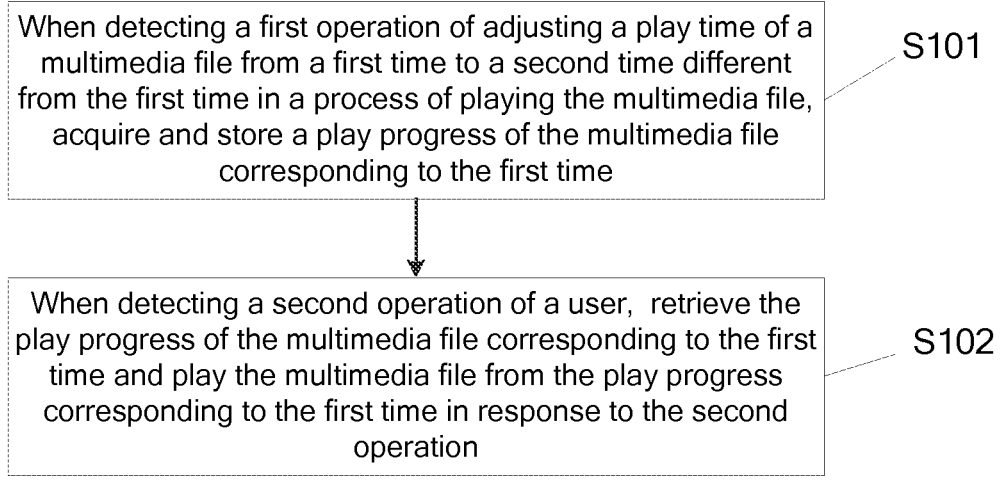
FIG. 1 is a schematic flowchart illustrating an information processing method according to a first embodiment of the present application.

With reference to FIG. 1, the embodiment of the present application provides an information processing method applied in an electronic device, the method comprising:

S101: when detecting a first operation of adjusting a play time of a multimedia file from a first time to a second time different from the first time in the process of playing the multimedia file, acquiring and storing a play progress of the multimedia file corresponding to the first time.

S102: when detecting a second operation of a user, retrieving the play progress of the multimedia file corresponding to the first time and playing the multimedia file from the play progress corresponding to the first time in response to the second operation.

Figure 2:
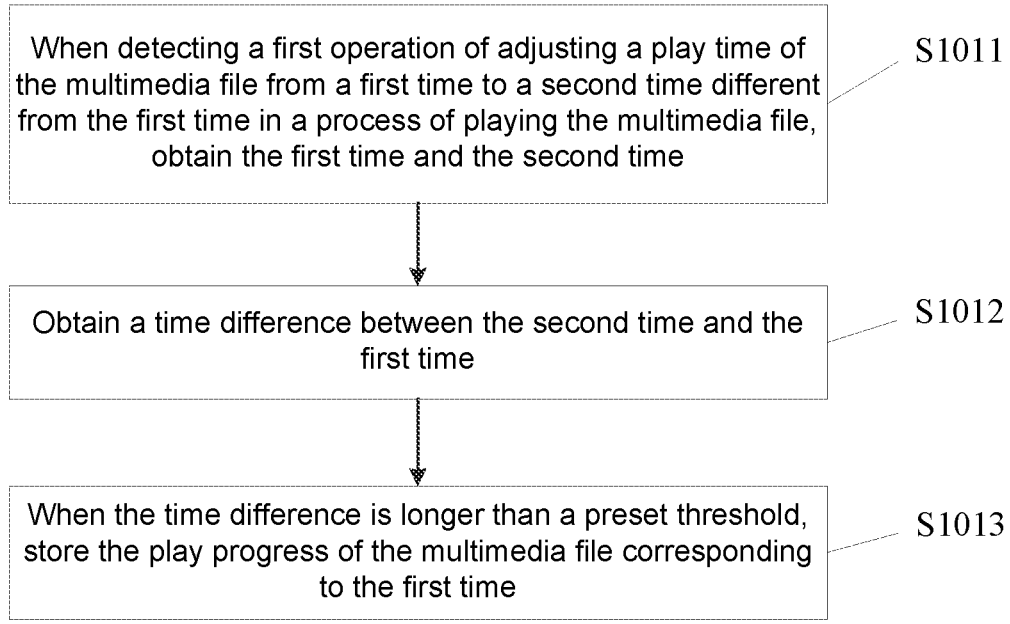
FIG. 2 is a schematic flowchart illustrating a specific implementation of step S101 in the information processing method according to the first embodiment of the present application.

In the embodiment of the present application, with reference to FIG. 2, S101 further comprises the following steps:

S1011: when detecting the first operation of adjusting a play time of the multimedia file from a first time to a second time different from the first time in the process of playing the multimedia file, acquiring the first time and the second time.

In a specific implementation, the multimedia file may be a video or an audio etc. The embodiment of the present application will be described taking video as example.

Specifically, the first operation adjusts a current play time of the video from the first time to the second time. The first operation may be a fast forward operation or a rewind operation. For example, if a play time before the fast forward operation of the user is 29 minutes and 45 seconds, and a play time after the fast forward operation is 33 minutes and 12 seconds, the acquired first time is 29 minutes and 45 seconds, and the acquired second time is 33 minutes and 12 seconds.

After S1011, the flow proceeds to S1012 of acquiring a time difference between the second time and the first time, in order to judge whether the first operation and the second operation corresponding to the fast forward operation of the user meet certain condition.

Specifically, by taking the first time of 29 minutes and 45 seconds and the second time of 33 minutes and 12 seconds as example, a time difference between the first time and the second time is obtained as 3 minutes and 27 seconds.

As another example, if the acquired first time is 1 minute and 17 seconds and the acquired second time is 1 minute and 23 seconds in S1011, a time difference between the first time and the second time is 16 seconds.

After the time difference is acquired, the flow proceeds to S1013 of storing the play progress of the multimedia file corresponding to the first time when the time difference is longer than a preset threshold.

In the embodiment of the present application, the preset threshold may be a time difference preset by a system, or a time difference set by a user according to his/her habits. For example, the preset threshold may be 1 minute or 20 seconds.

Specifically, if the threshold preset by the user is 20 seconds, and the above time difference of 3 minutes and 27 seconds is taken as an example, the time difference is longer than the preset threshold, and the electronic device will store a play progress corresponding to the first time of 29 minutes and 45 seconds, i.e., storing a frame number to which the video has been played. For example, if the video has 10000 frames, and when the above first operation is detected while the video is played to the $7025^{th}$ frame, the system will store the $7025^{th}$ frame of the video as the play progress of the video when the above condition is met.

In another example where the time difference is 16 seconds, since 16 seconds are less than 20 seconds, the system will not store a play progress corresponding to the first time of 1 minute and 17 seconds.

After S101, to enable the video to accurately return to a play progress corresponding to the play time before fast forward or rewind, the flow proceeds to step S102 of detecting a second operation of a user, retrieving the play progress of the multimedia file corresponding to the first time and playing the multimedia file from the play progress corresponding to the first time in response to the second operation.

In the embodiment of the present application, the second operation may be a recovery operation. There are a variety of methods to implement the second operation. For example, a button may be set on a video play device, and the user may perform the second operation by pressing the button. Alternatively, a button may be set on a menu bar upon playing a video, and the user may perform the second operation by clicking on the button with a mouse or by touching the button in case of a touch screen.

Specifically, when detecting the second operation, the electronic device will start to play the video from the play progress corresponding to the first time in response to the second operation.

In the embodiment of the present application, a button being set on a menu bar upon playing a video is taken as example. When a user clicks on the button in the process of playing the video, the electronic device will start to play back the video from a play progress corresponding to the first time of 29 minutes and 45 seconds, in the case of the first time of 29 minutes and 45 seconds and the second time of 33 minutes and 12 seconds.

Second Embodiment

Figure 3:
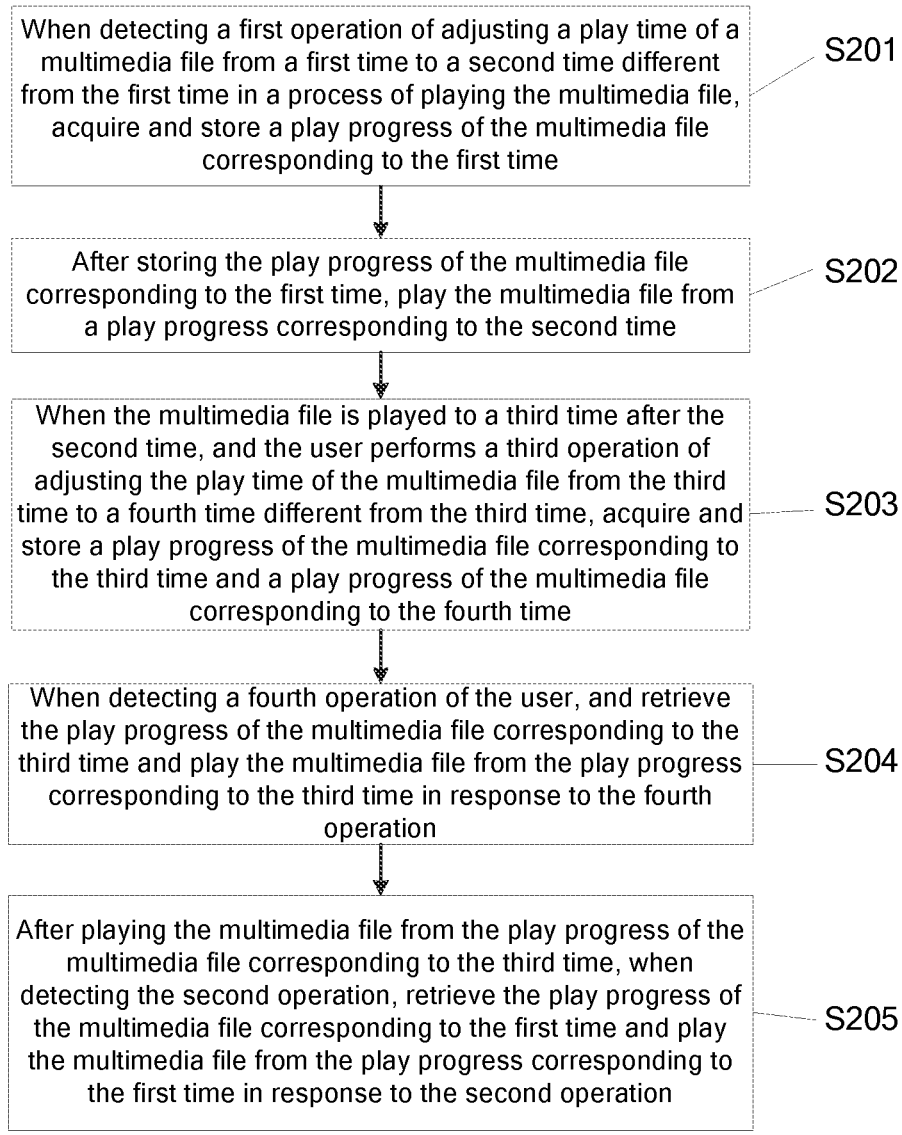
FIG. 3 is a schematic flowchart illustrating an information processing method according to a second embodiment of the present application.

In the embodiment of the present application, in order to enable a video to return to a play progress corresponding to a previous play time for playback after multiple fast forwards or rewinds, the electronic device may store play progresses corresponding to multiple time points. Specifically, with reference to FIG. 3, the method includes the following steps:

S201: when detecting a first operation of adjusting a play time of a multimedia file from a first time to a second time different from the first time in the process of playing the multimedia file, acquiring and storing a play progress of the multimedia file corresponding to the first time.

S202: after storing the play progress of the multimedia file corresponding to the first time, playing the multimedia file from a play progress corresponding to the second time.

S203: when the multimedia file is played to a third time after the second time, and the user performs a third operation of adjusting the play time of the multimedia file from the third time to a fourth time different from the third time, acquiring and storing a play progress of the multimedia file corresponding to the third time and a play progress of the multimedia file corresponding to the fourth time.

Specifically, S201 and S203 may be performed in the same manner as S101 in the first embodiment of the present application, and detailed description thereof will be omitted.

In a particular implementation, when a current play time of the video is 12 minutes and 14 seconds, and the user fast forwards a video to 14 minutes and 13 seconds, the electronic device stores a play progress corresponding to a first time of 12 minutes and 14 seconds. If the user again fast forwards the video to 17 minutes and 37 seconds 5 seconds after the video is played from a second time of 14 minutes and 13 seconds, the electronic device stores a play progress corresponding to a third time of 14 minutes and 18 seconds.

In the embodiment of the present application, in order to enable the video to return to a play progress corresponding to the previous play time for playback after multiple fast forwards or rewinds, multiple recovery operations may be performed on the video. Specifically, after S203, the method further includes:

S204: detecting a fourth operation of the user, and retrieving the play progress of the multimedia file corresponding to the third time and playing the multimedia file from the play progress corresponding to the third time in response to the fourth operation.

S205: after playing the multimedia file from the play progress of the multimedia file corresponding to the third time, when detecting the second operation, retrieving the play progress of the multimedia file corresponding to the first time and playing the multimedia file from the play progress corresponding to the first time in response to the second operation.

In a specific implementation of a first time of 12 minutes and 14 seconds and a third time of 14 minutes and 18 seconds, when detecting a fourth operation, i.e., a user performs a recovery operation, the electronic device starts to play back the video from a play progress corresponding to the third time of 14 minutes and 18 seconds. After the electronic device starts to play back the video from a play progress corresponding to the third time of 14 minutes and 18 seconds, when detecting the second operation, i.e., the user performs the recovery operation again, the electronic device starts to play back the video from a play progress corresponding to the first time of 12 minutes and 14 seconds.

In a specific implementation, by storing multiple play progresses, the user enables the video to return to a previous play progress for playback even after multiple fast forwards or rewinds in the process of viewing the video.

IN another example, the electronic device stores three play progresses in the process of playing a video, i.e., a play progress corresponding to a first time, a play progress corresponding to a second time, and a play progress corresponding to a third time, which correspond to a first fast forward, a second fast forward, and a third fast forward of the user respectively. When the user performs one recovery operation, the video starts to be played from a play progress corresponding to the third time; when the user performs two recovery operations successively, the video starts to be played from a play progress corresponding to the second time; and when the user performs three recovery operations successively, the video starts to be played from a play progress corresponding to the first time.

In the embodiment of the present application, the number of play progresses to be stored by the electronic device may be set. When the number of fast forwards of a user is larger than the preset number of play progresses to be stored, the play progresses corresponding to the video time points may be stored in a circular and overlapping manner. For example, the electronic device can store play progresses corresponding to three video time points, i.e., a play progress corresponding to a first time, a play progress corresponding to a second time, and a play progress corresponding to a third time respectively. When the user performs a fourth fast forward operation, the electronic device will overlap the play progress corresponding to the first time with a play progress corresponding to the fourth time and store the play progress corresponding to the fourth time.

Third Embodiment

In the embodiment of the present application, after multiple recovery operations of a user, the video may return to a play progress corresponding to a play time before the recovery operations for playback according to the stored play progresses. Specifically, the method includes the following steps.

First step: after playing the multimedia file from the play progress corresponding to the first time, detecting a fifth operation of a user, retrieving the play progress of the multimedia file corresponding to the third time and playing the multimedia file from the play progress corresponding to the third time in response to the fifth operation.

Second step: after playing the multimedia file from the play progress corresponding to the third time, detecting a sixth operation of a user, retrieving the play progress of the multimedia file corresponding to the fourth time and playing the multimedia file from the play progress corresponding to the fourth time in response to the sixth operation.

In a specific implementation, a first time of 12 minutes and 14 seconds, a third time of 14 minutes and 18 seconds and a fourth time of 15 minutes and 23 seconds are taken as example. After a user returns a video to a play progress corresponding to the first time of 12 minutes and 14 seconds with two recovery operations and the video starts to be played back, when detecting a recovery operation of the user, i.e., a third recovery operation of the user, the electronic device starts to play back the video from a play progress corresponding to the third time of 14 minutes and 18 seconds.

Further, when detecting a fourth recovery operation of the user, the electronic device starts to play back the video from a play progress corresponding to the fourth time of 15 minutes and 23 seconds.

Fourth Embodiment

Figure 4:
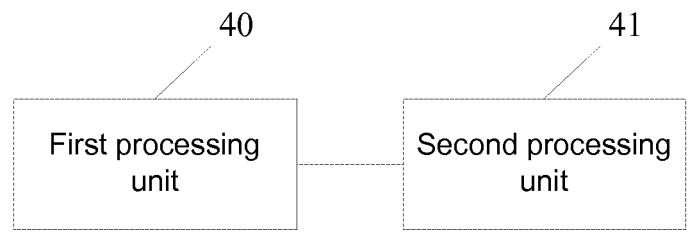
FIG. 4 is a block diagram showing an electronic device according to a fourth embodiment of the present invention.

The embodiment of the present application provides an electronic device. With reference to FIG. 4, the electronic device includes:

a first processing unit 40 configured to acquire and store a play progress of a multimedia file corresponding to a first time when detecting a first operation of adjusting a play time of the multimedia file from the first time to a second time different from the first time in the process of playing the multimedia file; and a second processing unit 41 configured to, when detecting a second operation of a user, retrieve the play progress of the multimedia file corresponding to the first time and play the multimedia file from the play progress corresponding to the first time in response to the second operation.

Alternatively, the first processing unit 40 further includes:

a first acquisition subunit configured to acquire the first time and the second time when detecting the first operation of adjusting a play time of the multimedia file from the first time to a second time different from the first time in the process of playing the multimedia file;

a second acquisition subunit configured to acquire a time difference between the second time and the first time; and a first storage subunit configured to store the play progress of the multimedia file corresponding to the first time when the time difference is longer than a preset threshold.

Alternatively, the second processing unit 41 is further configured to play the multimedia file from a play progress corresponding to the second time after storing the play progress of the multimedia file corresponding to the first time.

Alternatively, in order to return the video to a previous play time after multiple fast forwards or rewinds, the first processing unit 40 is further configured to acquire and store a play progress of the multimedia file corresponding to a third time and a play progress of the multimedia file corresponding to the fourth time different from the third time, when the multimedia file is played to the third time after the second time, and the user performs a third operation of adjusting the play time of the multimedia file from the third time to the fourth time after playing the multimedia file from a play progress corresponding to the second time; and the second processing unit 41 is further configured to, when detecting a fourth operation of the user, retrieve the play progress of the multimedia file corresponding to the third time, and play the multimedia file from the play progress corresponding to the third time in response to the fourth operation.

Alternatively, in order to enable multiple recovery operations, the second processing unit 41 is further configured to retrieve the play progress of the multimedia file corresponding to the first time and play the multimedia file from the play progress corresponding to the first time in response to the second operation, when detecting the second operation after playing the multimedia file from the play progress of the multimedia file corresponding to the third time.

Alternatively, in order to further return the video to a play progress corresponding to a play time before multiple recovery operations for playback by using the stored play progresses, the second processing unit 41 is further configured to detect t a fifth operation of the user, and retrieve the play progress of the multimedia file corresponding to the third time and play the multimedia file from the play progress corresponding to the third time in response to the fifth operation, after playing the multimedia file from the play progress corresponding to the first time.

Alternatively, in order to further return the video to a play progress corresponding to a play time before multiple recovery operations for playback by using the stored play progresses, the second processing unit 41 is further configured to detect a sixth operation of the user, and retrieve the play progress of the multimedia file corresponding to the fourth time and play the multimedia file from the play progress corresponding to the fourth time in response to the sixth operation, after playing the multimedia file from the play progress corresponding to the third time.

One or more of the solutions according to the embodiments of the present application provide at least the following advantages.

1. In the embodiments of the present application, when a first operation of adjusting a play time of a multimedia file from a first time to a second time different from the first time is detected in the process of playing the multimedia file, a play progress of the multimedia file corresponding to the first time is acquired and stored; and then a second operation of a user is acquired by detection, and the play progress of the multimedia file corresponding to the first time is retrieved to play the multimedia file from the play progress corresponding to the first time in response to the second operation. Therefore, even when a user misoperates a video unintentionally to fast forward or rewind the video to another play time, the video can return to a play progress corresponding to a play time before the misoperation through a recovery operation. This solves the technical problem that a video can not accurately return to the play progress corresponding to the previous play time for playback after being fast forwarded or rewound in the process of playing the video, and improves user experience.

2. In the embodiments of the present application, play progresses corresponding to multiple time points in a video can be stored. Therefore, the video can still accurately return to a play progress corresponding to a previous play time after multiple fast forwards or rewinds in the process of viewing a video by a user. For example, play progresses corresponding to three time points are stored in the electronic device, i.e., a play progress corresponding to a first time, a play progress corresponding to a second time, and a play progress correspond to a third time, which correspond to a first fast forward, a second fast forward, and a third fast forward of the user respectively, are stored in the process of playing the video. When the user performs one recovery operation, the video will start to be played from the play progress corresponding to the third time; when the user performs two recovery operations successively, the video will start to be played from the play progress corresponding to the second time; and when the user performs three recovery operations successively, the video will start to be played from the play progress corresponding to the first time. In this way, the video is able to return to a play progress corresponding to a previous play time even after multiple fast forwards or rewinds, thereby improving user experience.

Computer program instructions for implementing the information processing methods according to the embodiments of the present application may be stored on a storage medium such as an optical disk, a hard disk, a USB device etc., and when the computer program instructions stored in the storage medium are read and executed by an electronic device, the following steps are performed:

when detecting a first operation of adjusting a play time of the multimedia file from a first time to a second time different from the first time in the process of playing the multimedia file, acquiring and storing a play progress of the multimedia file corresponding to the first time; and when detecting a second operation of a user, retrieving the play progress of the multimedia file corresponding to the first time and playing the multimedia file from the play progress corresponding to the first time in response to the second operation.

Alternatively, when computer instructions stored in the storage medium, which correspond to the step of acquiring and storing a play progress of the multimedia file corresponding to the first time, are executed, the following steps are further performed:

when detecting the first operation of adjusting a play time of the multimedia file from a first time to a second time different from the first time in the process of playing the multimedia file, acquiring the first time and the second time;

acquiring a time difference between the second time and the first time; and when the time difference is longer than a preset threshold, storing the play progress of the multimedia file corresponding to the first time.

Alternatively, the storage medium further stores other computer instructions, which are executed after computer instructions corresponding to the step of storing the play progress of the multimedia file corresponding to the first time are executed, and the following steps are further performed when these computer instructions are executed:

playing the multimedia file from a play progress corresponding to the second time.

Alternatively, the storage medium further stores other computer instructions, which are executed after computer instructions corresponding to the step of playing the multimedia file from a play progress corresponding to the second time are executed, and the following steps are further performed when the other computer instructions are executed:

when the multimedia file is played to a third time after the second time while the user performs a third operation of adjusting the play time of the multimedia file from the third time to a fourth time different from the third time, acquiring and storing a play progress of the multimedia file corresponding to the third time and a play progress of the multimedia file corresponding to the fourth time; and when detecting a fourth operation of the user, retrieving the play progress of the multimedia file corresponding to the third time and playing the multimedia file from the play progress corresponding to the third time in response to the fourth operation.

Alternatively, the storage medium further stores other computer instructions, which are executed after computer instructions corresponding to the step of playing the multimedia file from the play progress of the multimedia file corresponding to the third time are executed, and the following steps are further performed when the other computer instructions are executed:

when detecting the second operation, performing a step of retrieving the play progress of the multimedia file corresponding to the first time to play the multimedia file from the play progress corresponding to the first time in response to the second operation.

Alternatively, the storage medium further stores other computer instructions, which are executed after computer instructions corresponding to the step of playing the multimedia file from the play progress corresponding to the first time are executed, and the following steps are further performed when the other computer instructions are executed:

when detecting a fifth operation of the user, retrieving the play progress of the multimedia file corresponding to the third time and playing the multimedia file from the play progress corresponding to the third time in response to the fifth operation.

Alternatively, the storage medium further stores other computer instructions, which are executed after computer instructions corresponding to the step of playing the multimedia file from the play progress corresponding to the third time are executed, and the following steps are performed when the other computer instructions are executed:

when detecting a sixth operation of the user, retrieving the play progress of the multimedia file corresponding to the fourth time and playing the multimedia file from the play progress corresponding to the fourth time in response to the sixth operation.

Various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

What is claimed is:

1. An information processing method in an electronic device capable of playing a multimedia file, the method comprising:
   in response to detecting a first operation of adjusting a play time of the multimedia file from a first time to a second time different from the first time in the process of playing the multimedia file,
      determining a time difference between the second time and the first time,
      playing the multimedia file from the second time with acquiring and storing a first play progress of the multimedia file corresponding to the first time if the time difference is larger than a preset threshold, and
      playing the multimedia file from the second time without acquiring and storing the first play progress of the multimedia file corresponding to the first time, if the time difference is equal to or less than the preset threshold; and
   in response to detecting a second operation of a user, the second operation being a recovery operation for returning to the first play progress of the multimedia file,
      retrieving the first play progress of the multimedia file corresponding to the first time, and
      playing the multimedia file from the retrieved first play progress in response to the second operation;
   wherein the electronic device is configured to store play progresses corresponding to multiple time points, and wherein the electronic device is configured to, in response to detecting a recovery operation for returning to a previous play progress, return to the previous play progress corresponding to a previous play time for playback after multiple operations.

2. The method according to claim 1, further comprising after storing the first play progress of the multimedia file corresponding to the first time:
    playing the multimedia file from a second play progress corresponding to the second time.

3. The method according to claim 2, further comprising after playing the multimedia file from the second play progress corresponding to the second time:
    when the multimedia file is played to a third time after the second time, and the user performs a third operation of adjusting the play time of the multimedia file from the third time to a fourth time different from the third time, acquiring and storing a third play progress of the multimedia file corresponding to the third time and a fourth play progress of the multimedia file corresponding to the fourth time; and
    when detecting a fourth operation of the user, retrieving the third play progress of the multimedia file corresponding to the third time and playing the multimedia file from the third play progress corresponding to the third time in response to the fourth operation.

4. The method according to claim 3, further comprising after playing the multimedia file from the third play progress of the multimedia file corresponding to the third time:
    when detecting the second operation, retrieving the first play progress of the multimedia file corresponding to the first time and playing the multimedia file from the first play progress corresponding to the first time in response to the second operation.

5. The method according to claim 4, further comprising after playing the multimedia file from the first play progress corresponding to the first time:
    when detecting a fifth operation of the user, retrieving the third play progress of the multimedia file corresponding to the third time and playing the multimedia file from the third play progress corresponding to the third time in response to the fifth operation.

6. The method according to claim 5, further comprising after playing the multimedia file from the third play progress corresponding to the third time:
    when detecting a sixth operation of the user, retrieving the fourth play progress of the multimedia file corresponding to the fourth time and playing the multimedia file from the fourth play progress corresponding to the fourth time in response to the sixth operation.

7. The method of claim 6, wherein each of the second, fourth, fifth and sixth operations comprises a recovery operation.

8. A non-transitory computer-readable medium storing computer instructions thereon, wherein when executed, the computer instructions cause an electronic device to perform an information processing method of claim 1.

9. An electronic device, comprising:
    a first processing unit configured to, in response to detecting a first operation of adjusting a play time of a multimedia file from a first time to a second time different from the first time in the process of playing the multimedia file,
        determine a time difference between the second time and the first time,
        play the multimedia file from the second time with acquire and store a first play progress of the multimedia file corresponding to the first time if the time difference is larger than a preset threshold, and
        play the multimedia file from the second time without acquiring and storing the first play progress of the multimedia file corresponding to the first time, if the time difference is equal to or less than the preset threshold; and
    a second processing unit configured to, in response to detecting a second operation of a user, the second operation being a recovery operation for returning to the first play progress of the multimedia file, retrieve the first play progress of the multimedia file corresponding to the first time and play the multimedia file from the first play progress corresponding to the first time in response to the second operation;
    wherein the electronic device is configured to store play progresses corresponding to multiple time points, and wherein the electronic device is configured to, in response to detecting a recovery operation for returning to a previous play progress, return to the previous play progress corresponding to a previous play time for playback after multiple operations.

10. The electronic device according to claim 9, wherein the second processing unit is further configured to play the multimedia file from a second play progress corresponding to the second time after storing the first play progress of the multimedia file corresponding to the first time.

11. The electronic device according to claim 10, wherein the first processing unit is further configured to acquire and store a third play progress of the multimedia file corresponding to a third time after the second time and a fourth play progress of the multimedia file corresponding to a fourth time different from the third time, when the multimedia file is played to the third time, and the user performs a third operation of adjusting the play time of the multimedia file from the third time to the fourth time after playing the multimedia file from the second play progress corresponding to the second time; and
    the second processing unit is further configured to, when detecting a fourth operation of the user, retrieve the play progress of the multimedia file corresponding to the third time and play the multimedia file from the third play progress corresponding to the third time in response to the fourth operation.

12. The electronic device according to claim 11, wherein the second processing unit is further configured to, when detecting the second operation after playing the multimedia file from the third play progress of the multimedia file corresponding to the third time, retrieve the first play progress of the multimedia file corresponding to the first time and play the multimedia file from the first play progress corresponding to the first time in response to the second operation.

13. The electronic device according to claim 12, wherein the second processing unit is further configured to, when detecting a fifth operation of the user after playing the multimedia file from the first play progress corresponding to the first time, retrieve the third play progress of the multimedia file corresponding to the third time and play the multimedia file from the third play progress corresponding to the third time in response to the fifth operation.

14. The electronic device according to claim 13, wherein the second processing unit is further configured to, when detecting a sixth operation of the user after playing the multimedia file from the play progress corresponding to the third time, retrieve the fourth play progress of the multimedia file corresponding to the fourth time and play the multimedia file from the fourth play progress corresponding to the fourth time in response to the sixth operation.

15. The electronic device of claim 14, wherein each of the second, fourth, fifth and sixth operations comprises a recovery operation.

\* \* \* \* \*